(No Model.)

C. M. FAIRBANKS.
PROCESS OF CUTTING FILES.

No. 316,764. Patented Apr. 28, 1885.

WITNESSES:
Charles H. Titus
James D. O'Hern

INVENTOR
Crawford M. Fairbanks
By Walter B. Vincent Atty.

UNITED STATES PATENT OFFICE.

CRAWFORD M. FAIRBANKS, OF LINCOLN, RHODE ISLAND.

PROCESS OF CUTTING FILES.

SPECIFICATION forming part of Letters Patent No. 316,764, dated April 28, 1885.

Application filed January 10, 1885. (No model.)

*To all whom it may concern:*

Be it known that I, CRAWFORD M. FAIRBANKS, of Lincoln, in the county of Providence and State of Rhode Island, have made certain new and useful Improvements in the Process of Making Flat Files; and I do hereby declare that the following specification, taken in connection with the drawings making a part of the same, is a full, clear, and exact description thereof.

Figure 2:
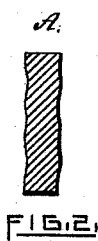
Figure 1:
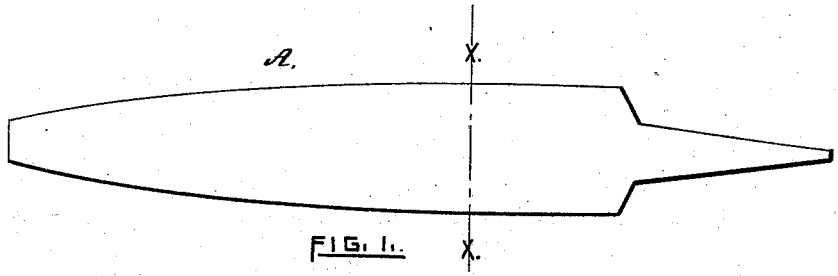
Figure 4:
Figure 3:
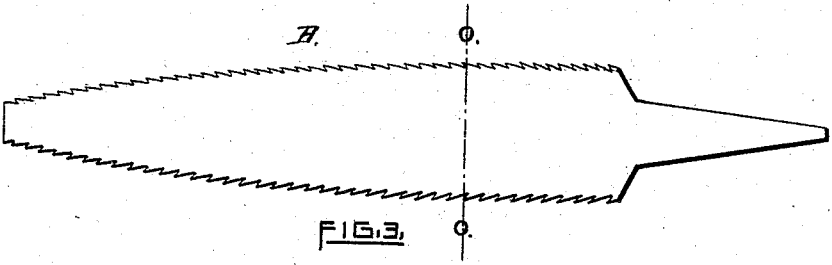
Figure 6:
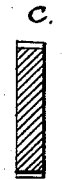
Figure 5:
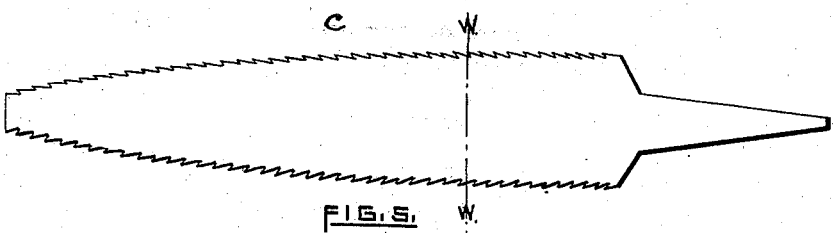

Figure 1 is a view of a file-blank with the edges prepared for cutting. Fig. 2 is a cross-section of same on line $x\ x$. Fig. 3 is a view of the blank with the edges cut. Fig. 4 is a cross-section on line $o\ o$. Fig. 5 is a view of the blank with edges cut and sides prepared for cutting. Fig. 6 is a section of same on line $w\ w$.

The object of my invention is to do away with one step in the process heretofore employed in cutting flat files, and thus save time, labor, and cost in the manufacture thereof; and it consists in the process hereinafter described.

It has heretofore been the invariable practice in the manufacture of flat files to prepare both the sides and edges of the blank for cutting in the first instance, and subsequently to cut the edges and sides in the order named. The cutting of the edges tends to spread them, both from the blow required to cut the teeth a sufficient depth, as well as from the projecting burr which results from such cutting. This spreading of the edges as described renders necessary the subsequent grinding, straightening, or preparing of the sides a second time before they are cut, so that the time, labor, and cost required for one smoothing and straightening of the sides are wholly lost.

In my invention I take a blank, A, Figs. 1 and 2, and prepare the edges only for cutting, leaving the sides uneven and rough as they came from the forge. I then proceed to cut the edges of the blank B, Figs. 3 and 4. This cutting will spread the edges of the blank, as shown in Fig. 4. I then, for the first time grind, straighten, or smooth the sides of the blank, as shown at C, Figs. 5 and 6, after which the sides are cut as described.

It will now be seen that the first grinding or straightening of the sides is entirely saved, and that the same result is obtained through the grinding or straightening of the sides subsequent to the cutting of the edges.

What I claim as my invention, and desire to secure by Letters Patent, is—

The process of cutting flat files herein described, consisting in first preparing and cutting the edges only and subsequently preparing and cutting the sides, as and for the purposes specified.

CRAWFORD M. FAIRBANKS.

Witnesses:
 WALTER B. VINCENT,
 CHARLES H. TITUS.